UNITED STATES PATENT OFFICE.

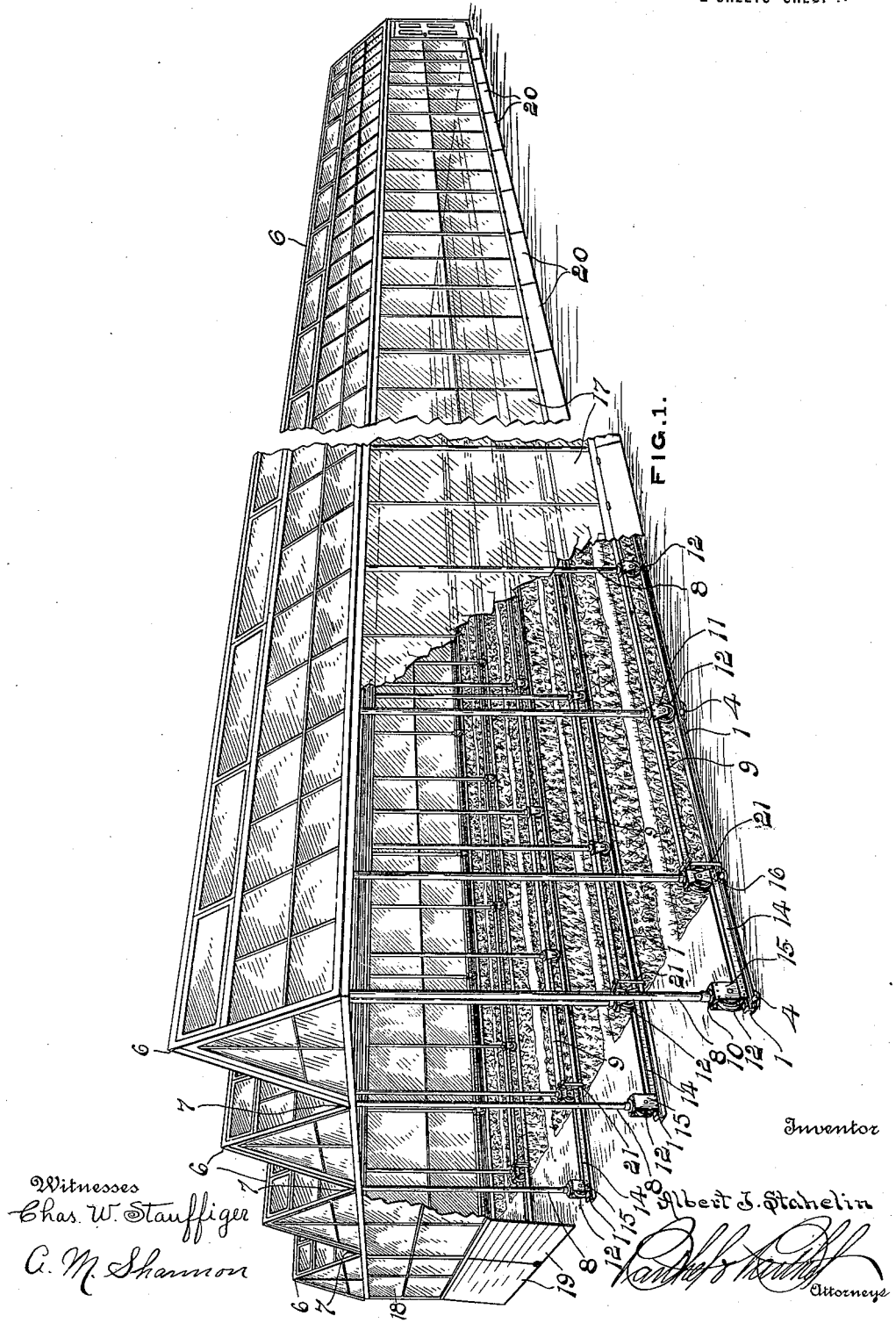

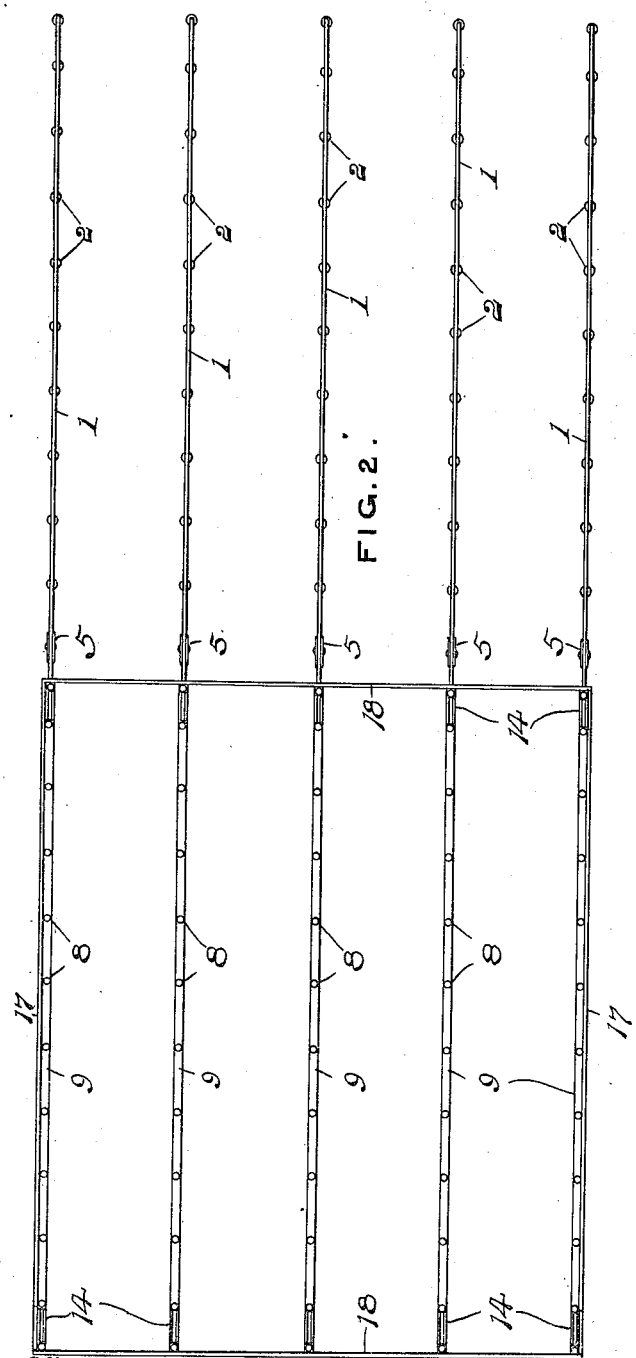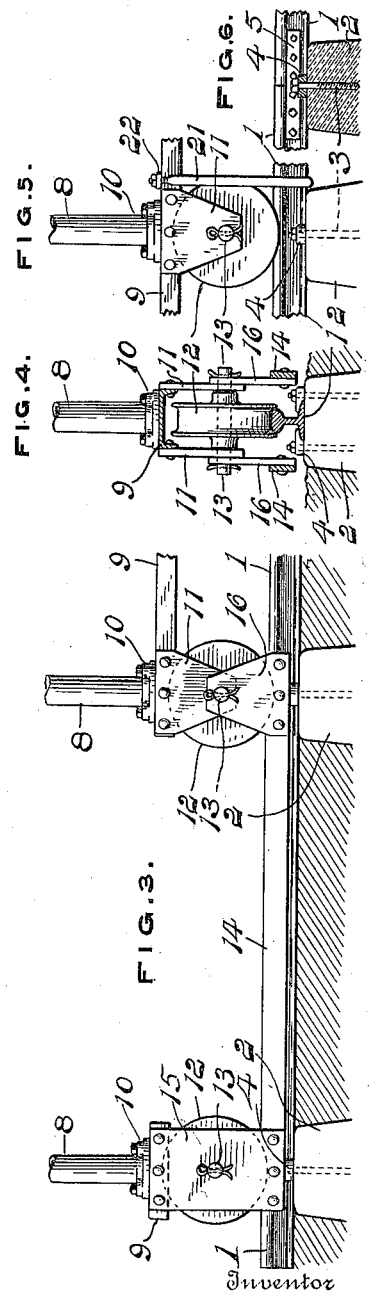

ALBERT J. STAHELIN, OF REDFORD, MICHIGAN.

GREENHOUSE.

1,142,539. Specification of Letters Patent. Patented June 8, 1915.

Application filed October 26, 1911. Serial No. 656,816.

*To all whom it may concern:*

Be it known that I, ALBERT J. STAHELIN, a citizen of the United States of America, residing at Redford, in the county of Wayne and State of Michigan, have invented certain new and useful Improvements in Greenhouses, of which the following is a specification, reference being had therein to the accompanying drawings.

In the raising of certain plants, vines, shrubs, etc., it is desirable that they be grown in the open during certain parts of the year and protected and kept in a warm atmosphere of even temperature during the remaining months, and further that this change may be accomplished without disturbing the plants. It is also desirable that these plants be grown in the ground rather than in trays or pots and in such manner that the earth may be exposed to the direct rays of the sun and the action of the elements for certain periods of time, without the necessity of moving it, that it may not become foul or unproductive. Furthermore it is most desirable that such plants, shrubs, etc., be housed under the same conditions as to temperature, light, sunshine, etc., that they would have under the most favorable circumstances out of doors and that they may be watered in a manner as nearly resembling natural conditions as possible.

The object of this invention is to so construct a greenhouse as to secure all of these desirable conditions without undue expenditure of money in constructing the house and with a great saving in time and labor in the growing of the plants, the invention consisting in connecting a series of greenhouses arranged side by side into one structure having a single inclosing wall and mounting said structure to travel upon track rails laid upon a plat of ground.

The invention further consists in so arranging the structure that all parts of the plat covered by it will be exposed to the sunlight and may be treated and watered in the same manner as an out door plat, and also in providing certain other new and useful features in the construction and arrangement of parts, all as hereinafter more fully described and particularly pointed out in the claims reference being had to the accompanying drawings, in which—

Figure 1 is a perspective view of a device embodying the invention with portions broken away to show the construction and to shorten the figure; Fig. 2 is a diagrammatic plan view of a greenhouse and track rails in outline; Fig. 3 is an enlarged detail of a portion of one of the sills showing a drop therein and the supporting wheels therefor; Fig. 4 is a transverse section of the same; Fig. 5 is a similar detail showing a portion of one of the sills, its supporting wheel and track rail in side elevation and a tie yoke for securing the sill to the rail; and Fig. 6 is a detail showing a portion of one of the rails.

A series of longitudinally extending parallel track rails 1 are supported with their lower sides substantially in the plane of the surface of a plat of ground, by securing these rails upon sunken piers 2 formed of concrete or other suitable material, by means of bolts 3 embedded in the concrete and provided with nuts on their upper ends to secure clips 4 in place thereon which clips engage the flanges of the rails and detachably secure them in place upon the piers. Each run of track rail is two or more times the length of a greenhouse structure which is adapted to be supported thereon so that this structure may be moved along the track rails to cover another portion of the plat of ground as desired. These rails are preferably made in sections and the sections secured together in the usual manner by fish plates 5 so that those sections of the rails which extend over the portion of the plat of ground not covered by the greenhouse may be detached and removed so that the ground may be cultivated in the usual manner and the only obstructions to such cultivation will be the piers, the upper ends of which are substantially even with the surface of the ground.

The upper frame work of the greenhouse may be of any suitable construction and will preferably comprise a series of roof structures 6 arranged side by side in parallelism with common meeting gutters 7. These connected roof structures together form a roof for the entire greenhouse and they are supported at the desired height by a series of iron posts 8 arranged in longitudinal rows and secured to the roof structure at the edges thereof and along the gutters. A series of parallel longitudinally extending sills 9 preferably formed of channel iron are provided and each longitudinal row of posts is secured to one of these sills by sockets 10 bolted to the upper sides of the sills to receive the screw threaded lower ends of the posts. Secured to the sides of each sill opposite each post is a pair of downwardly extending ears 11 between which is journaled a wheel 12 upon an axle or shaft 13 having bearings in the lower ends of the ears.

To form a walk or passage across the entire greenhouse at each end thereof, the sills 9 are each formed with a drop. This drop is formed at each end of each sill by cutting out a portion of the channel bar between the end post and the post adjacent thereto and then connecting these portions of the channel iron by parallel bars 14 lying at each side of the rail 1 and connected at their ends to the channel bar by plates 15 riveted to the sides of the channel bar opposite the end post and to the ends of the bars 14. At the opposite ends of the bars 14, plates 16 are riveted thereto and provided with an opening near their upper ends to receive the axle 13 of the wheel which is located below the end of the channel bar. The plates 15 are also formed with opening forming bearings for the axle 13 of the wheel journaled thereon and supporting the end post. A runway is thus provided across each end of the greenhouse and doors leading into these runways may be provided in the side walls 17 of the house. These side walls 17 are formed of panes of glass set in the usual frame work and extend from the edge of the roof downward to the sill. The end walls of the house are also formed of a glass portion 18 in the usual manner with a series of swinging doors 19 below the glass wall to close in between the rails 1 with their lower edges close to the ground. When the house is moved these doors are swung upward and out of the way of the plants or shrubs covered by the house. The space between the sills 9 along the side walls of the house and the ground is closed by a series of flaps 20 hinged or otherwise secured to the lower edge of the wall to rest with their lower edges on the ground and effectually close the space. When the house is moved these flaps are also turned upward so that the house may be freely moved. If desired this space may be boarded up in any suitable manner instead of providing the flaps.

To securely anchor the greenhouse structure so that it will not be moved along the tracks by the pressure of the wind blowing against it, yokes 21 extend beneath the track rails and upward at each side of the sills with a cross bar 22 extending across the sill and held in place by nuts engaging the screwthreaded upper ends of the yoke. These yokes are positioned adjacent to the wheels and form clamps to securely lock or clamp the sills to the rails with the wheels interposed and securely anchor the greenhouse structure to the rails which are in turn secured in place upon the plat of ground by the piers embedded therein.

By supporting the greenhouse upon track rails which are laid upon the surface of the ground and providing the house with a series of sills extending from end to end thereof, one above and adjacent to each track rail to carry the supporting posts for the roof, the whole interior of the greenhouse is left open so that the light and sunshine may reach every portion of the plat of ground covered by the house; and by providing transparent side walls which reach downward to the sills, the light is given free access to the plat of ground from no part of which the sunlight is cut off by the structure. The whole interior is open from one side wall to the other, the only obstructions being the small vertical iron posts which support the roof, and thus the plants or shrubs may be watered, cultivated and taken care of in the same manner that they would be if located in the open.

Obviously, changes may be made in the details of construction without departing from the spirit of my invention and I do not wish to limit myself to the particular arrangement and construction set forth.

Having thus fully described my invention what I claim is:—

1. The combination of a series of parallel track rails extending across and adjacent to the surface of a plat of ground, and a house structure comprising sills extending the length of the structure with one sill above and adjacent to each track rail and each sill formed with a drop to provide a transverse passage across the structure, and runners carried by the sills and engaging the rails.

2. The combination of a series of parallel track rails extending across and adjacent to the surface of a plat of ground, and a house structure comprising parallel sills extending the length of the structure with a sill above each track rail, a series of wheels carried by each sill to engage the track rails, and a drop in each sill comprising plates secured to the sides of the sill and bars connecting the lower ends of the plates and lying at each side of the track rails, said sill being cut away opposite said bars.

3. The combination of a series of parallel track rails extending across and adjacent to the surface of a plat of ground, a greenhouse structure comprising sills extending the length of the house with one sill parallel to and above each track rail, wheels carried by the sills and engaging the track rails to support the house structure thereon, and tie yokes embracing the sills and track rails to anchor the structure to said rails.

4. In a shiftable greenhouse structure, spaced sunken supports having the upper ends thereof flush with the ground, parallel rails detachably mounted upon said support, a greenhouse structure movable above said rails and having sills in proximity thereto, and means carried by said sills for anchoring said structures relatively to said rails.

In testimony whereof I affix my signature in presence of two witnesses.

ALBERT J. STAHELIN.

Witnesses:
 ANNA M. DORR,
 LEWIS E. FLANDERS.